United States Patent Office 3,418,239
Patented Dec. 24, 1968

3,418,239
OIL WELL WATERFLOODING METHOD
James E. Cooper, Dallas, Tex., assignor to Mobil Oil Corporation, a corporation of New York
No Drawing. Filed Dec. 3, 1965, Ser. No. 511,321
11 Claims. (Cl. 252—8.55)

ABSTRACT OF THE DISCLOSURE

A method for the recovery of oil from an oil-containing subterranean formation by injecting flooding liquid through an injection well into the formation and producing oil from the formation through a production well wherein there is injected into the formation an aqueous solution containing a water-soluble dietherbutanesulfonate having the following structural formula:

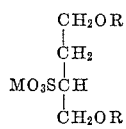

In this formula, R is an alkyl group containing from 5 to 16 carbon atoms, inclusive; a phenyl group; or an aralkyl group containing from 7 to 16 carbon atoms, inclusive; and M is an alkali metal ion; an ammonium ion; or a substituted ammonium ion.

---

The invention relates to compositions of matter and more particularly to surfactant compositions of matter. The invention also relates to a method of recovering petroleum hydrocarbons from subterranean formations.

It has been suggested to employ surfactant compositions for lowering interfacial tension between an aqueous phase and a hydrocarbon phase. A particular application for which such lowering of interfacial tension is advantageous is in displacing hydrocarbons from a subterranean formation by flowing water therein, as described in more detail hereinafter. The water employed in such application must travel from an injection well to fairly remote production wells spaced relatively long distances therefrom. The surfactants which have been employed in such water in the past have suffered from one or more objections. Some of the surfactants lowered interfacial tension only in alkaline environments yet they were hydrolyzed in such alkaline aqueous solutions with resultant loss of effect. Other surfactants underwent bacteriological or high temperature degradation. Other surfactants adsorbed onto the surfaces of the subterranean formation, leaving the aqueous solution without adequate surfactant in its passage through the subterranean formation.

It is a particular feature of the surfactant composition of matter of the invention to resist hydrolysis and degradation, thermal or bacteriological. Further, the surfactant composition of matter of the invention lowers interfacial tension between an aqueous solution and a hydrocarbon phase in alkaline pH environments without hydrolysis.

The invention comprises a water-soluble dietherbutanesulfonate having the following structural formula:

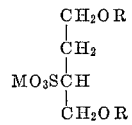

where:

R is an alkyl group containing from 5 to 16 carbon atoms, inclusive; a phenyl group; or an aralkyl group containing from 7 to 16 carbon atoms, inclusive; and M is an alkali metal ion; an ammonium ion; or a substituted ammonium ion.

The preferred surfactant composition is an alkali metal salt, an ammonium salt, or a substituted ammonium salt of the 1,4-diether-2-butane sulfonic acids. When the hydrocarbon groups R on the butanedioxy radical are alkyl groups, they contain from 5 to 16 carbon atoms each, inclusive. However, preferably, the alkyl groups will contain from 6 to 10 carbon atoms each, inclusive. The best results are obtained in reducing interfacial tension between aqueous and hydrocarbon phases, ordinarily, when each alkyl group contains about 8 carbon atoms. When the hydrocarbon groups are aralkyl groups, they should contain from 7 to 16 carbon atoms each, inclusive. However, preferably, the aralkyl groups should contain only one phenyl ring, although they may contain one or more alkyl group substituents thereon. The aralkyl groups may be substituted on the butanedioxy radical through either the alkyl portion or the aryl portion of the groups.

Although it is preferred that the hydrocarbon groups in the ethers be the same, they do not necessarily have to be the same.

Illustrative of suitable alkali metal ions are lithium, potassium, and sodium. Illustrative of suitable substituted ammonium ions are anilinium, o-toluidinium, p-toluidinium, m-toluidinium, methylammonium, dimethylammonium, trimethylammonium, tetramethylammonium, ethylammonium, n-propylammonium, isopropylammonium, n-butylammonium, iso-butylammonium, sec-butylammonium, tert-butylammonium ions.

The surfactant compositions of matter may be prepared by reacting a hydrocarbon oxide compound containing an alkoxy radical, aryloxy radical, or aralkoxy radical with a dihalobutene and sulfonating the resulting dietherbutene with a bisulfite. Known ion-exchange processes may be employed to effect replacement of the cation of the bisulfite with the desired cation in the surfactant. The preparation of ammonium 1,4-diether-2-butanesulfonate is illustrated by the following specific reaction equations. Equation 2 illustrates the preparation of the 1,4-diether-2-butene from starting reactants of 1,4-dichloro-2-butene and sodium hydrocarbonoxide in alcohol solvent. Equation 3 illustrates the final step of sulfonating the 1,4-diether-2-butene by addition of ammonium bisulfite, employing a catalyst. If desired, the ammonium cation may be replaced with an alkali metal cation or substituted ammonium cation simply by employing an ion-exchange resin containing the alkali metal or substituted ammonium cations.

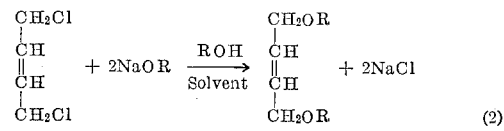

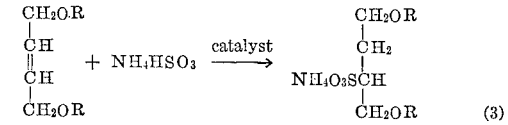

The reactants in Equation 2 are commercially available. However, as an alternative to employing the sodium hydrocarbonoxide, NaOR, per se, the alcohol, ROH, having the desired hydrocarbonoxy radical, —OR, may be reacted with sodium in an excess of the alcohol to provide the sodium hydrocarbonoxide as well as the desired alcohol solvent in which to carry out the reaction. In making the sodium hydrocarbonoxide, if the hydrocarbonoxy radical of the alcohol contains more than about 6 carbon atoms, it may be advantageous to react the sodium with a short chain alcohol containing less than 6 carbon atoms to produce a short chain alkoxide and then exchange the alkoxide radical with the larger hydrocarbonoxy radical in the desired alcohol. In this way, the reaction proceeds readily and smoothly and the short chain alcohol is easily distilled from the solution of the desired alcohol solvent containing the larger sodium hydrocarbonoxide molecules. A marker, such as toluene, may be employed to show, by its appearance in the overhead product from the distillation, that the short chain alcohol has been removed.

In any event, the sodium hydrocarbonoxide is dissolved in the alcohol solvent and the dichlorobutene added slowly over a prolonged period. The time required for the reaction may range from as little as fifteen minutes with a few hundred milliliters in small, highly efficient laboratory apparatus to as long as several hours with hundreds of gallons in large commercial reactors. The reaction may be carried out at a temperture within the range of from about 60° to about 90° C. When the reaction has been substantially completed, it is preferred to wash the product with hydrochloric acid to neutralize unreacted sodium hydrocarbonoxide, and then with water to ensure more nearly complete removal of the sodium chloride. The alcohol solvent is then removed by distillation under reduced pressure. Where a pure product is desired, it may be distilled off from the total reaction products at a temperature about its boiling point.

The sulfonation of the 1,4-diether-2-butene with a bisulfite, illustrated in Formula 3, is carried out as described in U.S. Patent No. 3,084,186, E. Clippinger, Preparation of Alkyl Sulfonates. Essentially, the steps comprise placing the 1,4-diether-2-butene in a reaction vessel and adding thereto an amount of from 0.001 to 0.1 mol of catalyst per mol of the 1,4-diether-2-butene. Suitable catalysts are free-radical initiators such as molecular oxygen, inorganic oxidizing compounds such as the inorganic peroxides, and organic peroxides. The organic peroxides, such as tert-butylperbenzoate, are preferred catalyst. The bisulfite in an alkaline aqueous solution is slowly added to the 1,4-diether-2-butene. Heat is simultaneously applied to maintain the temperature within the desired range, forming the desired reaction product of a water-soluble 1,4-diether-2-butanesulfonate. As noted in the above-cited patent, it is vital that the solution containing the bisulfite be added slowly enough to prevent the formation of adverse additional phases which inhibit the reaction. The reaction thus may take from one hour with a few hundred milliliters in small, highly efficient laboratory apparatus up to several hours to complete with hundreds of gallons in large commercial reactors.

A lower temperature limit of 70° C. is necessary in order to effect decomposition of the organic free-radical initiators, such as tert-butylperbenzoate, serving as catalyst and initiate the reaction. This lower temperature limit will vary with the catalyst chosen. However, an upper temperature limit of 100° C. represents the limit at which the water solvent is boiled off and imposes a maximum temperature limit.

The reaction product may be triturated with ether to remove impurities, and the water-soluble 1,4-diether-2-butanesulfonate is left as the solid phase. Sulfonation with ammonium bisulfite proceeds somewhat more readily than does sulfonation with alkali metal bisulfite. Therefore, to prepare the desired alkali metal 1,4-diether-2-butanesulfonate, it may be preferable to first prepare the ammonium 1,4-diether-2-butanesulfonate and then exchange the ammonium ion with the desired ion, e.g., exchange with the sodium ion to prepare the sodium 1,4-diether-2-butanesulfonate. Other dietherbutanesulfonates such as potassium 1,4-diether-2-butanesulfonate or lithium 1,4-diether-2-butanesulfonate may be prepared similarly.

As indicated hereinbefore, a dietherbutanesulfonate may be added to an aqueous phase in contact with a hydrocarbon phase to lower interfacial tension therebetween. A mixture of dietherbutanesulfonates may be so employed to effect this lowered interfacial tension. The dietherbutanesulfonate effects even lower interfacial tension when an electrolyte such as sodium chloride is incorporated into the aqueous phase.

In general, the higher the concentration of dietherbutanesulfonate in the aqueous phase the lower the interfacial tension between the aqueous phase and the hydrocarbon phase. Usually, a concentration less than the saturation concentration is employed. Thus, a concentration of from about 0.01 to about 5.0 percent by weight of water-soluble dietherbutanesulfonate is usually added to the aqueous phase.

Also, increasing the concentration of electrolyte in the aqueous phase lowers the interfacial tension between the aqueous phase containing the dietherbutanesulfonate and the hydrocarbon phase. However, there exists a concentration of electrolyte effecting the lowest interfacial tension which depends upon the type and concentration of dietherbutanesulfonate in the aqueous solution. A concentration of electrolyte effecting incipient precipitation of the dietherbutanesulfonate affords the lowest interfacial tension. The first precipitation of the dietherbutanesulfonate is indicated by slight turbidity. Such turbidity affords a visual indication that further increases in concentration of electrolyte are unnecessary and will, in fact, increase the interfacial tension between theaqueous and hydrocarbon phases. Usually, a concentration in the aqueous phase of electrolyte of from about 0.8 to about 5.0 percent by weight will effect the lowest interfacial tension.

One of the most significant applications for the dietherbutanesulfonates is as a surfactant in waterflooding. In waterflooding, water is injected through an injection well into an oil-containing subterranean formation as a supplemental source of energy to help produce oil therefrom. As is well known, the oil accumulated in a subterranean formation is produced, through wells drilled from the surface thereinto, employing formation energy. When only formation energy is employed in producing operations, much of the oil is not recovered from the subterranean formation. One of the most widely used techniques to supplement formation energy and to recover additional oil is the injection of a fluid through one of the wells, which has been called an injection well, and into the formation. Oil is displaced from the voids within the formation by the injection fluid and may be produced through another of the wells, called a production well, to the surface. When, as in waterflooding, the fluid which is injected through the injection well and into the formation is water, it tends to bypass the oil in the relatively restricted pore spaces of the subterranean formation. As a result, the water is produced at the production well before the desired amount of oil has been displaced from within the subterranean formation and produced from the production well.

In accordance with a feature of this invention, the recovery of oil by the flooding water is increased by incorporating in a slug or portion of the water a water-soluble dietherbutane-sulfonate. A mixture of dietherbutanesulfonates may be employed in the slug if desired. The dietherbutanesulfonate lowers the interfacial tension between the water and the oil being displaced from the subterranean formation, lessens the bypassing of the oil, and effects more nearly complete recovery of the oil.

When a dietherbutanesulfonate is employed as a surfactant in waterflooding, a concentration of from about 0.01 to about 5.0 percent by weight is employed in the aqueous solution. Preferably, a concentration of from about 0.1 to about 1.0 percent by weight of the dietherbutanesulfonate is employed in the aqueous solution. Where more than one dietherbutanesulfonate is employed, the total concentration thereof should be within the range of from about 0.01 to about 5.0, preferably about 0.1 to about 1.0, percent by weight of the aqueous solution.

When a slug of an aqueous solution of the dietherbutanesulfonates is employed in waterflooding, the size of the slug should be from about 1 to about 10 percent of the pore volume of the subterranean formation.

A single slug of an aqueous solution of dietherbutanesulfonate can be employed. However, multiple slugs may be employed if desired. In fact, the greater the number of slugs of the aqueous solution of the dietherbutanesulfonates that is employed the greater is the recovery of oil from the reservoir. However, at some point beyond employing from 1 to about 3 slugs of the dietherbutanesulfonate, it is no longer economically feasible because the value of the additional amounts of oil which are recovered decreases below the cost of supplying the surfactant to the flooding water. The characteristics of the particular reservoir and the in-situ oil will determine the specific economic advisability of the number of slugs or quantity of dietherbutanesulfonate to be employed.

The following examples will be illustrative of the invention.

Example 1

This example illustrates the preparation of the ammonium salt of 1,4-di-(2-ethylhexoxy)-2-butane sulfonic acid.

To prepare sodium 2-ethylhexoxide reactant, 24 grams of sodium ribbon, 100 milliliters of toluene, and 300 milliliters of methyl alcohol were added to a 1-liter, round-bottom flask equipped with a reflux condenser. When most of the sodium had dissolved, 290 milliliters of 2-ethylhexanol were added and the mixture allowed to stand overnight. Two hundred fifteen milliliters of liquid were distilled over at 65° to 75° C. Two hundred fifteen milliliters of toluene were added to the flask and distillation began again. Two hundred fifty milliliters of liquid were distilled over at 75° to 97° C.

To the resulting 2-ethylhexanol solution of sodium 2-ethylhexoxide, 56.706 grams of 1,4-dichloro-2-butene were added dropwise over a one-half hour period while the temperature was maintained at about 45° C. The reactants were stirred for an additional one-half hour, with heating to raise the temperature to 70° C. Heating was continued for three hours and the solution thereafter allowed to cool overnight. Solid sodium chloride formed and precipitated. The product was washed with three 250-milliliter portions of 10 percent hydrochloric acid and three 250-milliliter portions of water. The aqueous solution was drained from the 1,4-di-(2-ethylhexoxy)-2-butene in a separatory funnel. The product was washed again with saturated brine and dried over magnesium sulfate. The excess 2-ethylhexanol which was employed as solvent was removed by fractional distillation under reduced pressure, leaving 1,4-di-(2-ethylhexoxy)-2-butene as the reaction product.

A 100-milliliter, round-bottom flask was equipped with a condenser, a dropping funnel, and a magnetic stirrer. Into the flask were added 7.54 grams of 1,4-di-(2-ethylhexoxy)-2-butene and 1 drop of tert-butylperbenzoate. Into the dropping funnel were added 4.4 milliliters of water; 0.6 milliliter, or 0.0088 mol, of ammonium hydroxide; and 5.6 milliliters, or 0.0256 mol, of ammonium bisulfite. The apparatus was connected, heating begun, and the temperature raised to 83° C. A dropwise addition of the aqueous solution of ammonium bisulfite was commenced and completed over a two-hour period. Heating was continued for an additional three hours.

The contents of the flask were then transferred to an evaporating dish which was placed on a hot plate under the hood. When evaporation had proceeded until only a small amount of liquid remained, it was poured into a test tube where it separated into two layers. The upper layer, which was water insoluble, was withdrawn with a syringe. The lower layer was placed back in the evaporating dish and evaporated until only a yellowish solid remained.

The yellowish solid was triturated with three 10-milliliter portions of ether. The remaining puttylike material constituted 2.57 grams of ammonium 1,4-di-(2-ethylhexoxy)-2-butanesulfonate.

Example 2

The following example illustrates a use of the ammonium salt and the sodium salt of 1,4-di-(2-ethylhexoxy)-2-butane sulfonic acid in reducing the interfacial tension between an aqueous solution and an oil phase. The oil phase consisted of pure hexadecane, except for the run in which Yates crude was employed, resting in dropform beneath a glass microscope slide in a container filled with the aqueous solution at 25° C. The interfacial tension of pure hexadecane against water was measured to be 50 dynes per centimeter. The data obtained using the two surfactants are summarized in Table I. In Table I the "Composition" gives the weight percent of the particular surfactant in the aqueous solution. Also, in Table I under "Conditions" is shown the weight percent of other constituents present in the aqueous solution and where hexadecane is not employed as the oil phase, its replacement is set forth. Further, in Table I the interfacial tension is given in dynes per centimeter.

TABLE I

| Composition | Conditions | Interfacial tension (dyne/cm.) |
|---|---|---|
| Ammonium 1,4-di-(2-ethylhexoxy)-2-butanesulfonate 0.1%. | | 2.8 |
| Do | +0.5% NaCl | 0.39 |
| Do | +1.0% NaCl turbid | 0.17 |
| Do | +0.5% NaCl vs Yates crude oil, aged interface. | 0.04 |
| Sodium 1,4-di-(2-ethylhexoxy)-2-butanesulfonate 0.1%. | | 0.93 |
| Do | +1.0% NaCl | 0.63 |
| Do | +0.5% NaCl | 0.92 |

Having thus described the invention, it will be understood that such description has been given by way of illustration and example and not by way of limitation, reference for the latter purpose being had to the appended claims.

What is claimed is:

1. In a method for the recovery of oil from an oil-containing subterranean formation by injecting a flooding liquid through an injection well into said formation and producing oil from said formation through a production well, the improvement comprising injecting into said formation an aqueous solution containing in a concentration of from about 0.01 to about 5.0 percent by weight a water-soluble dietherbutanesulfonate having the following structural formula:

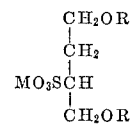

where:
R is an alkyl group containing from 5 to 16 carbon atoms, inclusive; a phenyl group; or an aralkyl group containing from 7 to 16 carbon atoms, inclusive; and
M is an alkali metal ion; an ammonium ion; or an anilinium, o - toluidinium, p - toluidinium, m - toluidinium, methylammonium, dimethylammonium, trimethylammonium, tetramethylammonium, ethylammonium, n-propylammonium, iso-propylammonium, n-butylammonium, iso-butylammonium, sec-butylammonium, or tert-butylammonium ion.

2. The method of claim 1 wherein said aqueous solution contains a concentration of from about 0.1 to about 1.0 percent by weight of said water-soluble dietherbutanesulfonate.

3. The method of claim 1 wherein said aqueous solution is injected in a slug having a volume of from about 1 to about 10 percent of the pore volume of the subterranean formation.

4. The method of claim 1 wherein said aqueous solution contains ammonium, anilinium, o-toluidinium, p-toluidinium, m-toluidinium, methylammonium, dimethylammonium, trimethylammonium, tetramethylammonium, ethylammonium, n-propylammonium, iso-propylammonium, n-butylammonium, iso-butylammonium, sec-butylammonium, or tert-butylammonium 1,4-dialkoxy-2-butanesulfonate; alkali metal 1,4-dialkoxy-2-butanesulfonate; or mixture thereof; wherein the alkyl groups in said dialkoxy radical contain from 5 to 16 carbon atoms each, inclusive.

5. The method of claim 4 wherein said alkyl groups contain from 6 to 10 carbon atoms each, inclusive.

6. The method of claim 1 wherein said 1,4-dialkoxy-2-butanesulfonate is 1,4-di-(2-ethylhexoxy)-2-butanesulfonate.

7. The method of claim 4 wherein said methylammonium 1,4-di(2-ethylhexoxy)-2-butanesulfonate; dimethylammonium 1,4-di-(2-ethylhexoxy)-2-butanesulfonate; trimethylammonium 1,4-di-(2-ethylhexoxy)-2-butanesulfonate; tetramethylammonium 1,4-di-(2-ethylhexoxy)-2-butanesulfonate; or mixture thereof.

8. The method of claim 4 wherein said aqueous solution contains ammonium 1,4-di-(2-ethylhexoxy)-2-butanesulfonate; alkali metal 1,4-di-(2-ethylhexoxy)-2-butanesulfonate; or mixture thereof.

9. The method of claim 8 wherein said alkali metal 1,4-di-(2-ethylhexoxy)-2-butanesulfonate is sodium 1,4-di-(2-ethylhexoxy)-2-butanesulfonate.

10. The method of claim 1 wherein said aqueous solution contains ammonium, anilinium, o-toluidinium, p-toluidinium, m-toluidinium, methylammonium, dimethylammonium, trimethylammonium, tetramethylammonium, ethylammonium, n-propylammonium, iso-propylammonium, n-butylammonium, iso-butylammonium, sec-butylammonium, or tert-butylammonium 1,4-diphenoxy-2-butanesulfonate; alkali metal 1,4-diphenoxy-2-butanesulfonate; or mixture thereof.

11. The method of claim 1 wherein said aqueous solution contains ammonium, anilinium, o-toluidinium, p-toluidinium, m-toluidinium, methylammonium, dimethylammonium, trimethylammonium, tetramethylammonium, ethylammonium, n-propylammonium, iso-propylammonium, n-butylammonium, iso-butylammonium, sec-butylammonium, or tert-butylammonium 1,4-diaralkoxy-2-butanesulfonate; alkali metal 1,4-diaralkoxy-2-butanesulfonate; or mixture thereof; wherein the aralkyl groups in said diaralkoxy radical contain from 7 to 16 carbon atoms each, inclusive.

References Cited

UNITED STATES PATENTS

| | | | |
|---|---|---|---|
| 1,823,439 | 9/1931 | De Groote | 252—8.55 |
| 2,028,091 | 1/1936 | Jaeger | 252—8.55 X |
| 2,555,270 | 5/1951 | Deebel | 260—615 |
| 3,084,186 | 4/1963 | Clippinger | 260—513 |

HERBERT B. GUYNN, *Primary Examiner.*

U.S. Cl. X.R.

252—353, 355; 166—9; 260—501.15, 501.21, 512, 513

UNITED STATES PATENT OFFICE
CERTIFICATE OF CORRECTION

Patent No. 3,418,239                                                                          December 24, 19

James E. Cooper

It is certified that error appears in the above identified patent and that said Letters Patent are hereby corrected as shown below:

Column 3, line 1, "alkovide" should read -- alkoxide --. Column 4, line 26, "theaqueous" should read -- the aqueous --. Column 6, line 16, "in" should read -- In --; line 37, same column 6, TABLE 1, second column, line 8 thereof, "+0.5%" should read -- +5.0% --. Column 7, line 18, the claim reference numeral "1" should read -- 4 --; line 21, after "wherein said" insert -- aqueous solution contains --.

Signed and sealed this 10th day of March 1970.

(SEAL)
Attest:

Edward M. Fletcher, Jr.                              WILLIAM E. SCHUYLER, JR.

Attesting Officer                                                 Commissioner of Patents